(12) United States Patent
Wakui et al.

(10) Patent No.: US 6,406,395 B1
(45) Date of Patent: Jun. 18, 2002

(54) BELT FOR CONTINUOUSLY VARIABLE TRANSMISSION

(75) Inventors: Hiroshi Wakui; Kouhei Ohsono, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/583,904

(22) Filed: Jun. 1, 2000

(30) Foreign Application Priority Data

Jun. 4, 1999 (JP) .......................................... 11-158331

(51) Int. Cl.[7] ................................................ F16G 5/16
(52) U.S. Cl. ...................................................... 474/242
(58) Field of Search .............................. 474/43, 44, 45, 474/91, 201, 237, 240, 241, 242, 243, 244, 245

(56) References Cited

U.S. PATENT DOCUMENTS

| | | | | |
|---|---|---|---|---|
| 4,292,031 A | * | 9/1981 | Rattunde | 474/18 |
| 4,894,048 A | * | 1/1990 | Inukai et al. | 474/240 |
| 4,894,049 A | * | 1/1990 | Koppelaars | 474/240 |
| 5,533,940 A | * | 7/1996 | Smeets | 474/242 |
| 5,776,023 A | * | 7/1998 | Okawa et al. | 474/243 |
| 6,015,359 A | * | 1/2000 | Kunii | 474/18 |
| 6,086,499 A | * | 7/2000 | Brandsma | 474/201 |
| 6,110,065 A | * | 8/2000 | Yagasaki et al. | 474/244 |
| 6,174,253 B1 | * | 1/2001 | Walter et al. | 474/18 |

FOREIGN PATENT DOCUMENTS

| | | |
|---|---|---|
| EP | 0 962 679 A | 12/1999 |
| JP | 62-131143 | 8/1987 |
| JP | 6-2743 | * 1/1994 ................. 474/201 |

* cited by examiner

*Primary Examiner*—David A. Bucci
*Assistant Examiner*—Vicky A. Johnson
(74) *Attorney, Agent, or Firm*—Arent Fox Kintner Plotkin & Kahn

(57) ABSTRACT

A continuously variable transmission having a metal belt and pulleys is provided to effectively lubricate the pulley contact surfaces of a metal element of the belt of the transmission with lubricating oil supplied via a rotary shaft of the pulley. This makes it hard for a contaminant present in the lubricating oil to adhere to the metal element. When the saddle surface of the metal element is taken as a reference, the height h1 to the inner end in the radial direction of a pulley contact surface is set to be smaller than the height h2 to the inner end in the radial direction of the lateral middle part of an element main body. The inner end in the radial direction of the middle part of the element main body protrudes inwards in the radial direction by a distance d from the inner end in the radial direction of the opposite ends thereof. Lubricating oil supplied to the inner circumferential surface of the metal belt wrapped around the pulley, can be supplied smoothly from the lateral middle part of the metal element to the oppostie ends thereof by centrifugal force, thus effectively lubricating the pulley contact surface of the metal element and the V-face of the pulley.

2 Claims, 5 Drawing Sheets

BELT FOR CONTINUOUSLY VARIABLE TRANSMISSION

BACKGROUND OF THE INVENTION

1. Field of the Invention

The present invention relates to a belt for a continuously variable transmission. The belt is formed by supporting a large number of metal elements on a pair of right and left metal ring assemblies wherein multiple sheets of endless metal rings are layered. While the belt is wrapped around a pulley and transmits driving force, the contact part between the pulley contact surfaces of the metal elements and the V-face of the pulley is lubricated by lubricating oil supplied from the rotary shaft of the pulley.

2. Description of the Prior Art

Metal elements which are used in metal belts for continuously variable transmissions are described in Japanese Utility Model Registration Application Laid-open No. 62-131143. FIG. 5 shows the above-mentioned conventional metal element 32 comprising an element main body 34, a neck part 36 and an ear part 37 having pulley contact surfaces 39, 39 which are in contact with V-faces 38, 38 of a pulley at both the right and left ends of the element main body 34. When saddle surfaces 44, 44 with which the inner circumferential surfaces of metal ring assemblies 31, 31 are in contact are taken as a reference, the distance h1' from the saddle surfaces 44, 44 to the inner end in the radial direction of the pulley contact surfaces 39, 39 is set to be larger than the distance h2 from the saddle surfaces 44, 44 up to the inner end in the radial direction of a lateral middle part of the element main body 34. That is to say, at the inner end in the radial direction of the element main body 34, the opposite ends in the lateral direction protrude inwards in the radial direction from the lateral middle part by a distance d'.

When a metal belt is wrapped around the pulley, in order to lubricate the contact part between the V-faces of the pulley and the pulley contact surfaces formed at the opposite ends in the lateral direction of the metal elements, lubricating oil is supplied towards the inner circumferential surface of the metal belt via the rotary shaft of the pulley. At this time, since the opposite ends in the lateral direction of the conventional metal element 32 shown in FIG. 5 protrude inwards in the radial direction, the lubricating oil supplied via the rotary shaft of the pulley is pushed back by the inward protrusions at the both ends of the metal element 32 as shown by the arrows a and it is therefore difficult for the lubricating oil to flow into the contact parts between the pulley contact surfaces 39, 39 of the metal element 32 and the V-faces 38, 38 of the pulley. Furthermore, with regard to the chord sections of the metal belt which extend linearly between the drive pulley and the driven pulley, since it is difficult for the lubricating oil to be discharged from the indentation at the inner end in the radial direction of the metal element 32 (the hatched area in FIG. 5), there is a problem that a contaminant such as a metal powder present in the lubricating oil, will adhere to the metal element 32.

SUMMARY OF THE INVENTION

The present invention has been made in view of the above-mentioned circumstances, and it is an object of the present invention to effectively lubricate the pulley contact surfaces of the metal element with lubricating oil supplied via the rotary shaft of the pulley and, moreover, to prevent a contaminant present in the lubricating oil, from adhering to the metal element.

In order to achieve the above-mentioned object, the invention is directed to a belt for a continuously variable transmission which is formed by supporting a large number of metal elements on a pair of right and left metal ring assemblies. The belt comprises multiple layered sheets of endless metal rings wrapped around a pulley for transmitting a driving force. The contact part between the pulley contact surfaces of the metal elements and the V-face of the pulley is lubricated by lubricating oil supplied from the rotary shaft of the pulley. The inner end in the radial direction of a lateral middle part of the metal element, protrudes inwards in the radial direction from the level of an inner end in the radial direction of the pulley contact surfaces formed at opposite ends of the metal elements.

In accordance with the above-mentioned arrangement, when lubricating oil is supplied from the rotary shaft of the pulley to the inner circumferential surface of the belt which is wrapped around the pulley, since the inner end in the radial direction of the lateral middle part of the metal element protrudes inwards in the radial direction from the inner end of the pulley contact surfaces formed at the opposite ends of the metal element, the lubricating oil flows from the lateral middle part to the opposite ends at the inner end in the radial direction of the metal element, thus effectively lubricating the pulley contact surfaces of the metal element. Furthermore, since no cavity is formed at the inner end in the radial direction of the metal element, when the belt is in a chord section between the pulleys, it becomes hard for the lubricating oil to remain at the inner end in the radial direction of the metal element thus preventing a contaminant such as a metal powder from adhering thereto.

In addition, a belt for a continuously variable transmission is characterised in that, with regard to the metal elements, the height to the inner end in the radial direction of the opposite ends in the right-and-left direction relative to the saddle surface supporting an inner circumferential surface of the metal ring assembly, is set to be smaller than the height to the inner end in the radial direction of the lateral middle part relative to said saddle surface.

In accordance with this arrangement, when the height to the inner end in the radial direction of the middle part of the metal element, relative to the saddle surfaces thereof, is set to be at a minimum in the range in which the metal element can survive the compressive load in the right-and-left direction applied from the V-groove of the pulley, the height to the inner end in the radial direction of the pulley contact surfaces relative to the saddle surfaces thereof is set so as to be smaller than the above-mentioned height and the gear ratio range can, therefore, be enlarged by making the metal element approach the rotary shaft of the pulley as closely as possible without restrictions on the position of the inner end in the radial direction of the pulley contact surfaces.

The driven pulley 11 in the embodiment corresponds to the pulley of the present invention and the driven shaft 10 in the embodiment corresponds to the rotary shaft of the present invention.

BRIEF DESCRIPTION OF THE DRAWINGS

Practical features of the present invention are described below by reference to an embodiment of the present invention shown in the attached drawings.

FIG. 1 to FIG. 4 illustrate an embodiment of the present invention.

FIG. 1 is a diagram of the power transmission system of a vehicle on which a continuously variable transmission of the present invention is mounted.

FIG. 2 is an enlarged view of essential parts in FIG. 1.

FIG. 4 is a front view of a metal element of the present invention.

DETAILED DESCRIPTION OF THE PREFERRED EMBODIMENT

Figure 3A:
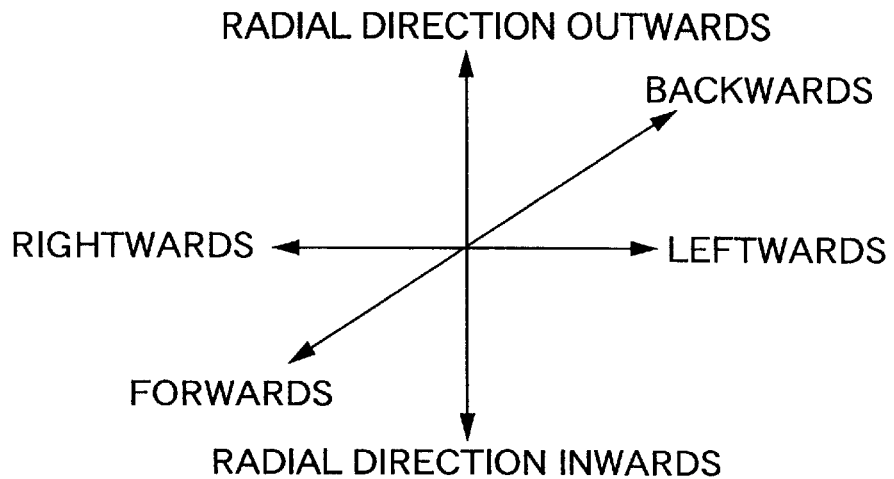
FIGS. 3A and 3B are oblique views of a part of a metal belt and the directional axes thereof.

The back-and-forth direction, the right-and-left direction and the radial direction of a metal element used in the described embodiment are defined as shown in FIG. 3A. The radial direction is defined as the radial direction of a pulley with which the metal element is in contact, the side closer to a rotary shaft of the pulley is the inner side in the radial direction, and the side farther from the rotary shaft of the pulley is the outer side in the radial direction. The right-and-left direction is defined as the direction along the rotary shaft of the pulley with which the metal element is in contact, and the back-and-forth direction is defined as the direction along which the metal element advances.

Figure 1:
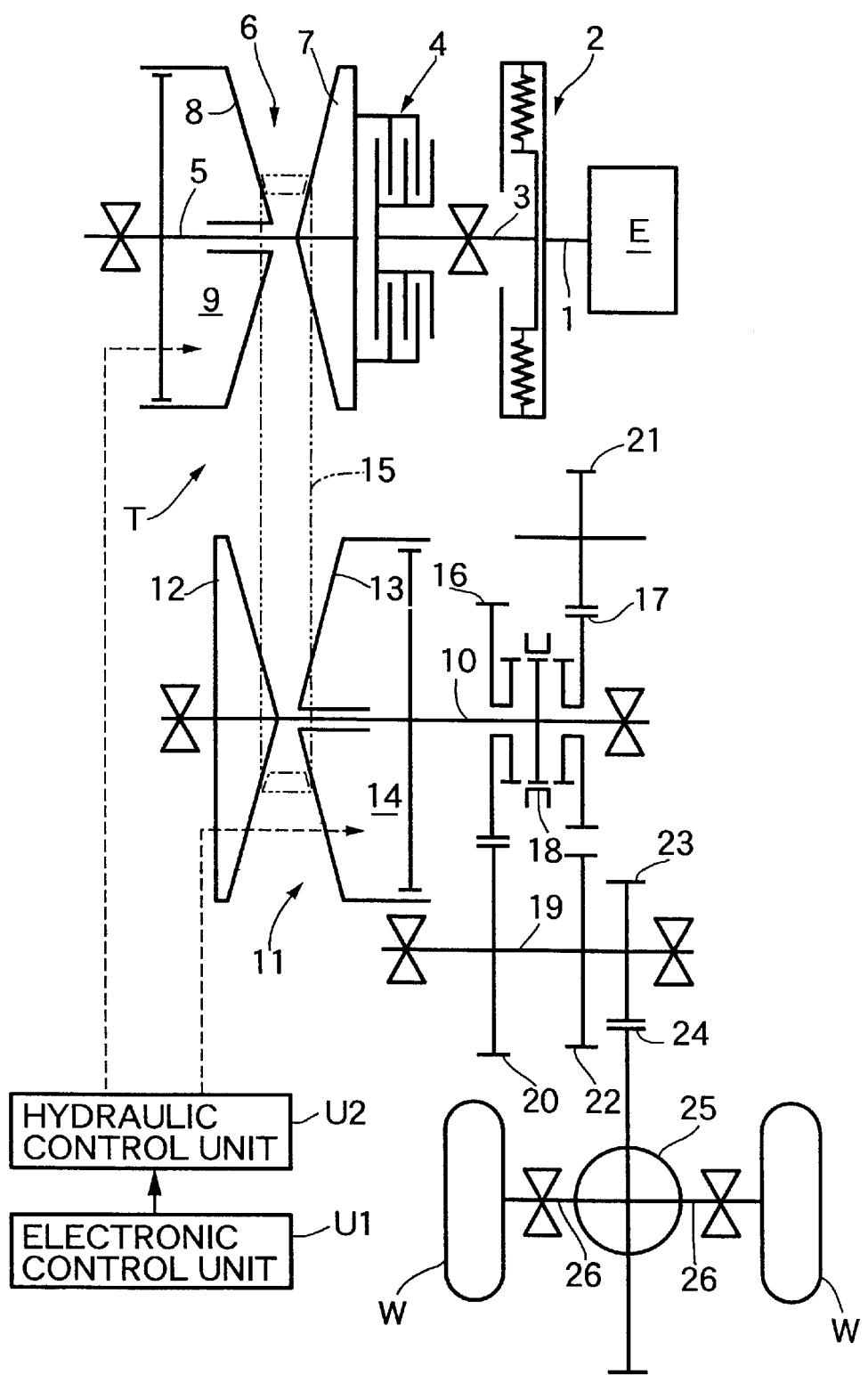
Figure 2:
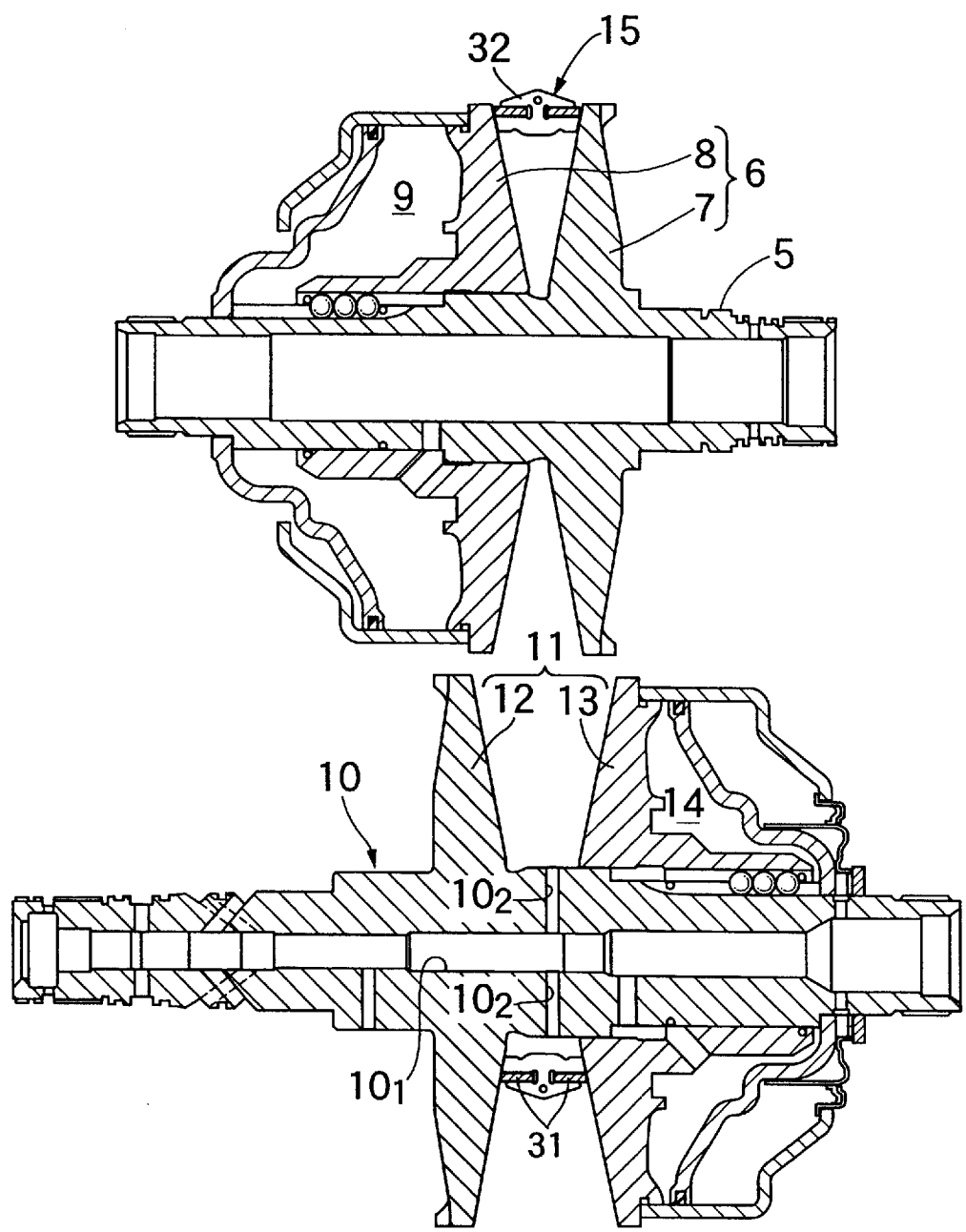

FIG. 1 and FIG. 2 show the structure of a metal belt type continuously variable transmission T mounted in an automobile, in which an input shaft 3 connected to a crankshaft 1 of an engine E via a damper 2, is connected to a drive shaft 5 of the metal belt type continuously variable transmission T via a starting clutch 4. A drive pulley 6 mounted on the drive shaft 5, comprises a stationary pulley half 7 which is secured to the drive shaft 5 and a movable pulley half 8 which is movable towards and away from the stationary pulley half 7. The movable pulley half 8 is pushed towards the stationary pulley half 7 by means of hydraulic pressure applied to an oil chamber 9.

A driven pulley 11 mounted on a driven shaft 10 which is positioned parallel to the drive shaft 5, comprises a stationary pulley half 12 which is secured to the driven shaft 10 and a movable pulley half 13 which is movable towards and away from the stationary pulley half 12. The movable pulley half 13 is pushed towards the stationary pulley half 12 by means of hydraulic pressure applied to an oil chamber 14. A metal belt 15 formed by supporting a large number of metal elements 32 on a pair of right and left metal ring assemblies 31, 31, is wrapped around both the drive pulley 6 and the driven pulley 11 (see FIG. 2). Each metal ring assembly 31 is formed by layering twelve sheets of metal ring 33.

In order to lubricate the metal belt 15, an oil passage $10_1$ is formed along the center of the driven shaft 10, and oil passages $10_2$, $10_2$ which diverge from the oil passage $10_1$, open between the stationary pulley half 12 and the movable pulley half 13 of the driven pulley 11 (see FIG. 2).

The driven shaft 10 carries a forward drive gear 16 and a reverse drive gear 17 in a relatively rotatable manner, and the forward drive gear 16 and reverse drive gear 17 can be connected selectively to the driven shaft 10 by means of a selector 18. An output shaft 19 is positioned parallel to the driven shaft 10. A forward driven gear 20 which is meshed with the forward drive gear 16 and a reverse driven gear 22 which is meshed with the reverse drive gear 17 via an idler reverse gear 21, are secured to output shaft 19.

The rotation of the output shaft 19 is input to a differential 25 via a final drive gear 23 and a final driven gear 24 and transmitted therefrom to driven wheels W, W via right and left axles 26, 26.

The drive power of the engine E is thus transmitted to the driven shaft 10 via the crankshaft 1, the damper 2, the input shaft 3, the starting clutch 4, the drive shaft 5, the drive pulley 6, the metal belt 15 and the driven pulley 11. When the forward travel range is selected, the drive power of the driven shaft 10 is transmitted to the output shaft 19 via the forward drive gear 16 and the forward driven gear 20, and the vehicle is thus driven forward. When the reverse travel range is selected, the drive power of the driven shaft 10 is transmitted to the output shaft 19 via the reverse drive gear 17, the idler reverse gear 21 and the reverse driven gear 22, and thus the vehicle is driven backwards.

At this stage, by controlling the hydraulic pressures applied to the oil chamber 9 of the drive pulley 6 and the oil chamber 14 of the driven pulley 11 of the metal belt type continuously variable transmission T by means of a hydraulic control unit $U_2$ operated by commands from an electronic control unit $U_1$, the gear ratio can be adjusted continuously. That is to say, by increasing the hydraulic pressure applied to the oil chamber 14 of the driven pulley 11 relative to the hydraulic pressure applied to the oil chamber 9 of the drive pulley 6, the groove width of the driven pulley 11 decreases thus increasing the effective radius; accompanying this, the groove width of the drive pulley 6 increases thus decreasing the effective radius, and therefore the gear ratio of the metal belt type continuously variable transmission T changes towards "LOW" in a continuous manner. On the other hand, by increasing the hydraulic pressure applied to the oil chamber 9 of the drive pulley 6 relative to the hydraulic pressure applied to the oil chamber 14 of the driven pulley 11, the groove width of the drive pulley 6 decreases thus increasing the effective radius; accompanying this the groove width of the driven pulley 11 increases thus decreasing the effective radius, and therefore the gear ratio of the metal belt type continuously variable transmission T changes towards "OD" in a continuous manner.

Figure 3B:
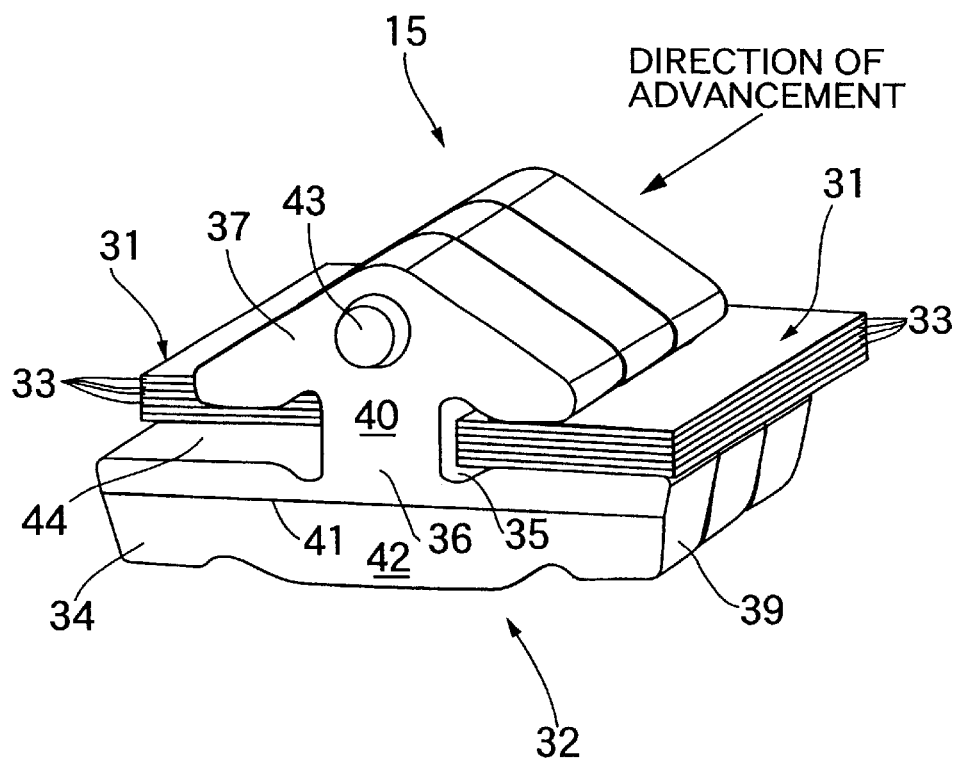
Figure 4:
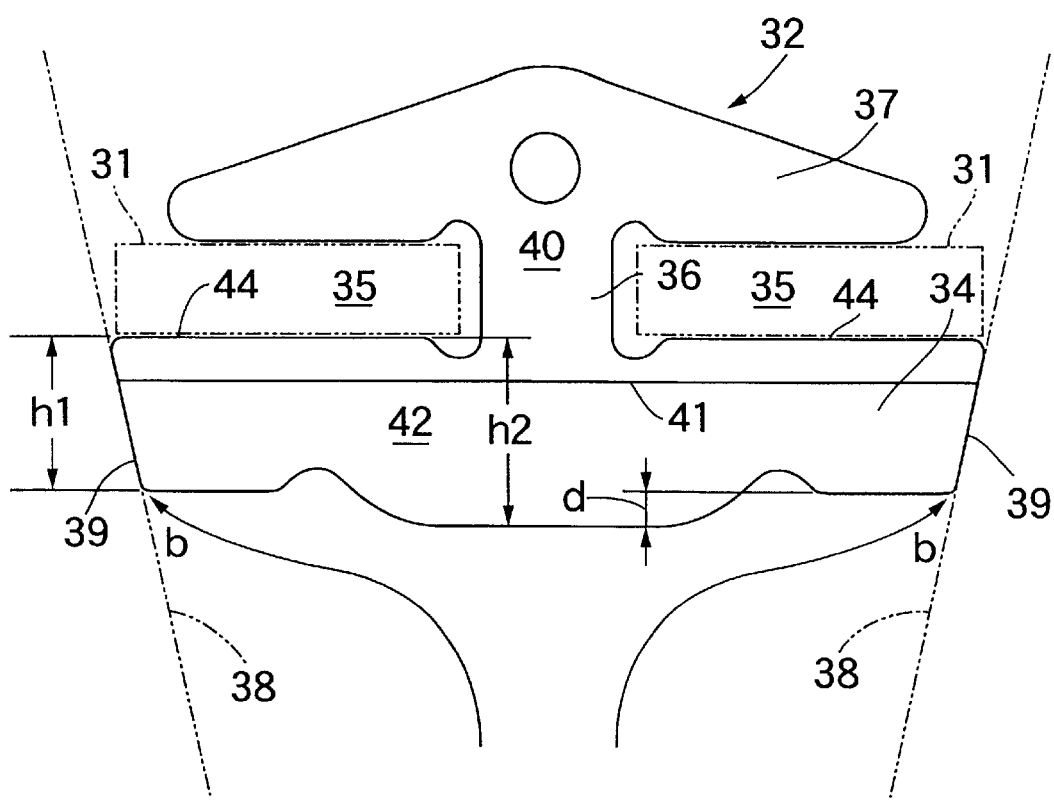

As shown in FIG. 3B and FIG. 4, a metal element 32 formed by subjecting a metal sheet to stamping, comprises an element main body 34 having a roughly trapezoidal shape, a neck part 36 positioned between a pair of right and left ring slots 35, 35 in which metal ring assemblies 31, 31 fit, and an ear part 37 having a roughly triangular shape which is connected to the top of the element main body 34 via the neck part 36. On the opposite ends in the lateral direction of the element main body 34, are formed a pair of pulley contact surfaces 39, 39 which can make contact with the V-faces 38, 38 of the drive pulley 6 or the driven pulley 11. On the forward side and the backward side in the direction of advancement of the metal element 32, a pair of forward and backward main surfaces 40, 40 which are parallel to each other and normal to the direction of advancement, are formed, and an inclined surface 42 is formed beneath the main surface 40 on the forward side in the advancement direction via a locking edge 41 which extends in the lateral direction. Furthermore, in order to join metal elements 32, 32 which are longitudinally adjacent to each other, concavo-convex parts 43 are formed on the forwards and backwards surfaces of the ear part 37.

As is clear from FIG. 4, when the saddle surfaces 44, 44 formed on the inner side in the radial direction of the ring slots 35, 35 of the metal element 32 are taken as a reference, the height h1 to the inner end in the radial direction of the pulley contact surfaces 39, 39 is set to be smaller than the height h2 to the inner end in the radial direction of the lateral middle part (beneath the neck part 36) of the element main body 34, and the inner end in the radial direction of the lateral middle part of the element main body 34 protrudes inwards in the radial direction by a distance d from the inner end in the radial direction of the opposite ends thereof.

Therefore, when the metal belt 15 is wrapped around the driven pulley 11, lubricating oil supplied to the inner circumferential surface of the metal belt 15 via the oil passages $10_2$, $10_2$ of the driven shaft 10 can be supplied smoothly from the middle part in the lateral direction of the metal element 32 to the opposite ends in the lateral direction thereof by centrifugal force as shown by the arrows b in FIG. 4, thus effectively lubricating the pulley contact surfaces 39, 39 of the metal element 32 and the V-faces 38, 38 of the driven pulley 6. In sections where the metal belt 15 is wrapped around neither the drive pulley 6 nor the driven pulley 11, that is in the chord sections between the drive pulley 6 and the driven pulley 11, since the lubricating oil is rapidly discharged without being retained on the inner circumferential surface of the metal belt 15, it becomes hard for a contaminant such as a metal powder present in the lubricating oil to adhere to the metal element 32.

In order to enlarge the gear ratio range of the metal belt type continuously variable transmission T, it is necessary for the metal element 32 of the metal belt 15 wrapped around the drive pulley 6, to be able to approach the drive shaft 5 as closely as possible and for the metal element 32 of the metal belt 15 wrapped around the driven pulley 11 to be able to approach the driven shaft 10 as close as possible. Thus the height to the inner end in the radial direction of the metal element 32 measured from the saddle surfaces 44, 44 of the metal element 32 should be reduced to a minimum. However, in order for the metal element 32 to survive the compressive load in the lateral direction applied from the drive pulley 6 and the driven pulley 11, it is impossible to reduce the height in the section adjacent the neck part 36 of the metal element 32 without limitation, and a minimum height for ensuring the strength is necessary.

Figure 5:
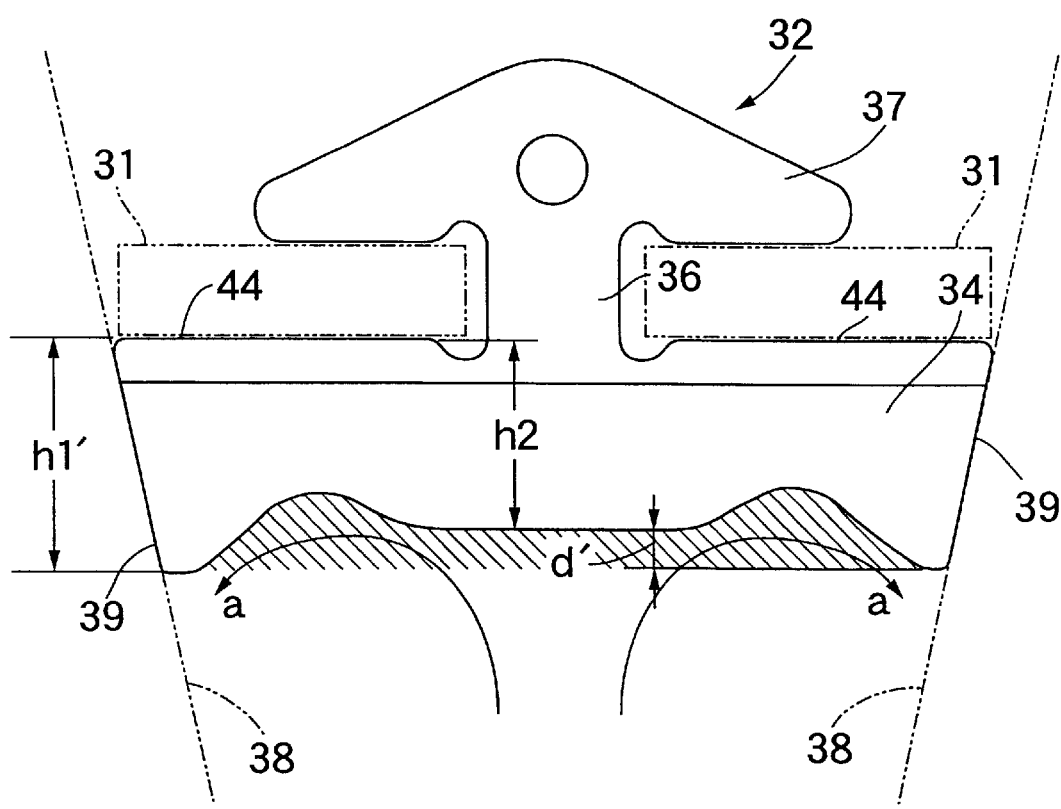
FIG. 5 is a prior art metal element.

As is clear from a comparison of the metal element 32 of the present embodiment shown in FIG. 4 and the conventional metal element 32 shown in FIG. 5, when the height h2 of the lateral middle part which is adjacent the neck part 36 of the metal element 32 is identical in the two cases, since the pulley contact surfaces 39, 39 of the conventional metal element 32 in FIG. 5 protrude inwards in the radial direction by a distance d', the maximum height of the metal element 32 measured from the saddle surfaces 44, 44 becomes h1'. Since the pulley contact surfaces 39, 39 of the metal element 32 of the present invention in FIG. 4 recede outwards in the radial direction by a distance d, the maximum height of the metal element 32 measured from the saddle surfaces 44, 44 becomes h2 (<h1'), which is shorter than the maximum height of the conventional metal element 32.

Thus, in accordance with the present invention, since the maximum height of the metal element 32 measured from the saddle surfaces 44, 44 can be reduced, the metal element 32 can approach the drive shaft 5 as closely as possible at LOW ratios, the metal element 32 can approach the driven shaft 10 as closely as possible at OD ratios and, as a result, the gear ratio range can be enlarged on both the LOW and the OD ratio sides.

As hereinbefore described, in accordance with the present invention, when lubricating oil is supplied from the rotary shaft of a pulley to the inner circumferential surface of the belt for a continuously variable transmission which is wrapped around the pulley, since the inner end in the radial direction of the middle part of the metal element protrudes inwards in the radial direction from the inner end in the radial direction of the pulley contact surfaces formed at the opposite ends of the metal element, the lubricating oil flows from the middle part to the opposite ends at the inner end in the radial direction of the metal element, thus effectively lubricating the pulley contact surfaces of the metal element. Furthermore, since no cavity is formed on the inner end in the radial direction of the metal element, when the belt for a continuously variable transmission is in a chord section between the pulleys, it becomes hard for the lubricating oil to remain at the inner end in the radial direction of the metal element, thus preventing a contaminant such as a metal powder from adhering thereto.

When the height to the inner end in the radial direction of the middle part of the metal element relative to the saddle surfaces thereof is set to be a minimum in the range in which the metal element can survive the compressive load applied from the V-groove of the pulley, the height to the inner end in the radial direction of the pulley contact surfaces relative to the saddle surfaces thereof, is set to be smaller than the above-mentioned height and the gear ratio range can, therefore, be enlarged by making the metal element approach the rotary shaft of the pulley as closely as possible without restrictions on the position of the inner end in the radial direction of the pulley contact surfaces.

The present invention may be embodied in other specific forms without departing from the spirit or essential characteristics thereof. The presently disclosed embodiment is therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A belt for a continuously variable transmission including pulleys each having a V-face contact surface and a rotary shaft, said belt comprising a plurality of metal elements having contact surfaces for contacting the V-face contact surface, a pair of metal ring assemblies having a plurality of layered sheets of endless metal rings, said belt being wrapped around the pulley for transmitting a driving force thereto, wherein the contacting part between the pulley contact surfaces of said metal elements and the V-face of the pulley is lubricated by lubricating oil supplied from said rotary shaft of the pulley, and wherein an inner end in the radial direction of a lateral middle part of said metal element protrudes inwards in the radial direction from the level of an inner end in the radial direction of the pulley contact surfaces formed at opposite ends in the lateral direction of the metal elements.

2. A belt for a continuously variable transmission according to claim 1, wherein the height (h1) of the metal elements to the inner end in the radial direction of the opposite ends relative to a saddle surface thereof supporting an inner circumferential surface of a metal ring assembly is set to be smaller than the height (h2) to the inner end in the radial direction of the lateral middle part relative to the saddle surface.

* * * * *